United States Patent

Roberts et al.

[15] 3,642,007
[45] Feb. 15, 1972

[54] CONTINUOUS WAVE LASER SURGICAL DEVICE

[72] Inventors: Thomas G. Roberts, 2712 Mastin Lake Road N.W., Huntsville, Ala. 35810; John J. Ehrlich, 207 1/2 Walker Avenue N.E., Huntsville, Ala. 35801; Guilford J. Hutcheson, Jr., 4002 Marie Avenue N.W., Huntsville, Ala. 35805; Charles M. Rust, 6511 Sheri Drive N.W., Huntsville, Ala. 35806

[22] Filed: Aug. 12, 1969

[21] Appl. No.: 858,239

Related U.S. Application Data

[63] Continuation-in-part of Ser. No. 581,112, Sept. 21, 1966, abandoned.

[52] U.S. Cl. .................................128/395, 128/303.1
[51] Int. Cl. .................................................A61m 5/01
[58] Field of Search .............128/303.1, 305, 395–398; 331/94.5

[56] References Cited

UNITED STATES PATENTS

| | | | |
|---|---|---|---|
| 3,149,290 | 9/1964 | Bennett, Jr. et al. | 331/94.5 |
| 3,348,547 | 10/1967 | Kavanagh | 128/395 |
| 3,369,101 | 2/1968 | DiCurcio | 331/94.5 |
| 3,382,343 | 5/1968 | Muncheryan | 331/94.5 |
| 3,404,350 | 10/1968 | Muncheryan | 331/94.5 |
| 3,464,028 | 8/1969 | Moeller | 331/94.5 |
| 3,481,340 | 12/1969 | McKnight et al. | 128/395 |
| 3,523,256 | 8/1970 | Johnson | 331/94.5 |

OTHER PUBLICATIONS

Litwin et al, "Journal of the American Medical Association" Vol. 187, No. 11, March 14, 1964, pp 154–159

*Primary Examiner*—William E. Kamm
*Attorney*—Harry M. Saragovitz, Edward J. Kelly, Herbert Berl and James T. Deaton

[57] ABSTRACT

A laser surgical device that utilizes a continuous wave laser that has a wavelength such that the laser beam when focused at the surface of the tissue or point of contact is nearly totally absorbed at the surface to thereby allow the device to function as a cutting instrument without having adverse effects upon other portions of the body or tissues that are beneath the surface. The laser is mounted for movement so that a physician can manually manipulate the laser beam in a back and forth motion to make an opening of desired depth. The laser also has controls for controlling the length of time the laser is on and the power that is supplied to the laser.

12 Claims, 2 Drawing Figures

THOMAS G. ROBERTS
JOHN J. EHRLICH
GUILFORD J. HUTCHESON, JR
CHARLES M. RUST,
INVENTORS.

3,642,007

CONTINUOUS WAVE LASER SURGICAL DEVICE

DEDICATORY CLAUSE

The invention described herein may be manufactured, used, and licensed by or for the Government for Governmental purposes without the payment to us of any royalty thereon.

CROSS REFERENCE TO RELATED APPLICATION

This application is a continuation-in-part of copending application Ser. No. 581,112 filed Sept. 21, 1966 and now abandoned.

BACKGROUND OF THE INVENTION

Known laser surgical devices utilize pulsed systems. These systems require very elaborate excitation mechanisms and cooling systems. Also, shielding material is needed to protect one against the light pumps as they are subject to explosions. These devices also need very elaborate and critical optical systems to allow the operator to position the laser beam when both small and large movements are necessary. Although fiber optics can be used to overcome some of the above difficulties, these fibers can not be used in a surgical device because the loss per unit length is such that they will not carry sufficient average energy without being damped. To use a pulsed system as a versatile surgical device requires pulse rates and average powers which are not now available. Such a device would also require a very steady hand, even for a surgeon. Because of the nature of pulsed lasers, the surgeon has incomplete control of the exposure time and the power density. Control of the amount of radiation from a laser surgical device can be critical, and a device is desired which will allow the surgeon complete control over this factor. A device is also needed whereby a wide range of power outputs can be obtained on a continuous basis so that hemostatic surgery such as long incisions or hemophiliac, partial liver amputations, incisions which must remain open for long periods of time, etc., can be accomplished. All this should be done without requiring flash tubes and their associated bulky power supplies or energy storage devices.

An object of this invention is to provide a continuous wave laser surgical device.

A further object of this invention is to provide a high-power continuous wave laser surgical device having output power densities which can be controlled and regulated by the operator and having a suitable optical and control system from a laser surgical device.

SUMMARY OF THE INVENTION

In accordance with this invention a continuous wave laser is provided that has a wavelength output such that the energy of the laser is substantially totally absorber at the surface of contact to thereby act as a cutter instrument when moved along the surface. The laser is mounted such that the laser beam can be universally manipulated within limits to direct the laser beam to the desired surface to be cut or opened. The laser has control means for controlling the laser including means for controlling the power output of the laser and the duration of time the laser is on. The controls are such that the laser can be turned on and off at will by the operating physician.

BRIEF DESCRIPTION OF THE DRAWING

In the drawing forming a part of this specification.

DESCRIPTION OF THE PREFERRED EMBODIMENT

Figure 1:
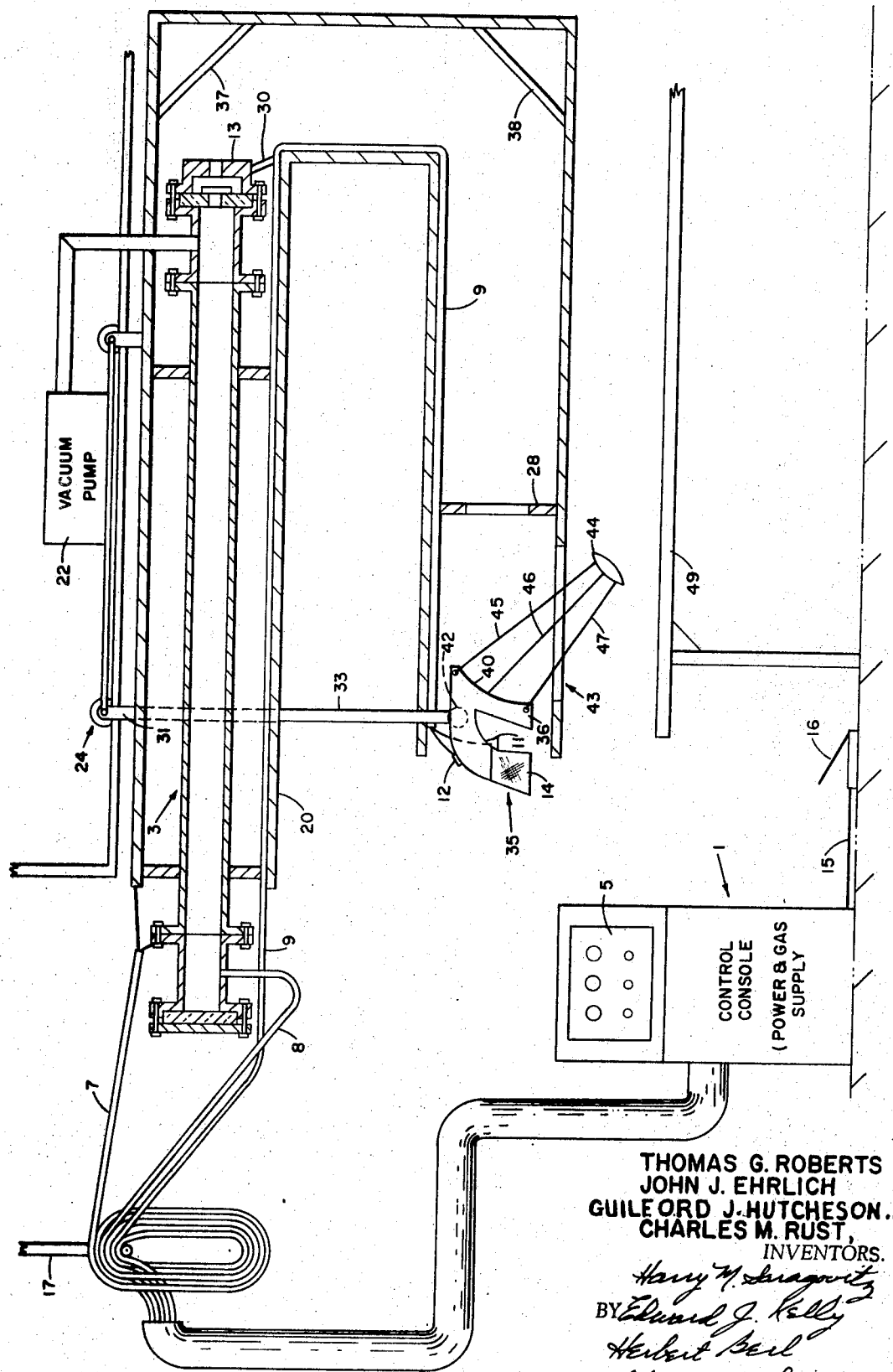
FIG. 1 is a diagrammatic representation of a preferred form of the present invention.

The physical appearance of the overall invention is shown in FIG. 1. A control console 1 is provided to supply the continuous wave gas laser 3 with power and gas. Control console 1 has a panel 5 for setting the mode of operation of the laser desired by an operator. Panel 5 may also be provided with visual readout of the power, gas, time, etc. Connections from the console to the laser are made through cable 7 and tube 8. A further cable 9 connects starter trigger 11, shutter trigger 12 and shutter 13 to the console. Triggers 11 and 12 are mounted on handle 14. Cable 15 connects a foot control starter trigger 16 to appropriate circuitry in console 1. Support means 17 is provided to keep flexible elements 7–9 up out of the way.

A $CO_2$-$N_2$ gas laser 3 is mounted inside an enclosure 20 and is supported thereby.

Laser 3 may be any continuous wave laser which has sufficient output power at a wave length which is nearly totally absorbed at the surface of the tissue or point of contact to perform surgery and lend itself to rigid control requirements. Of course, the $CO_2$-$N_2$ laser provides an output beam which has a wavelength that is nearly totally absorbed at the surface of the tissue to be cut. Manipulation of the laser must be such that the operator has complete control of the laser.

A vacuum pump 22 is provided for the laser and is mounted on the carriage mechanism 24, however, the laser could be operated in a sealed off configuration and pump 22 omitted. Power connections to the laser are made to the laser by way of leads in cable 7. A ground connection from cable 7 may also be made to enclosure 20. The gas supply is provided by tube 8. Both the power and the gas supplies to the laser are controlled by console 1.

A shutter device 13 is mounted on the output end of the laser. The shutter device may be mounted elsewhere; such as behind the diaphragm 28. Shutter 13 is controlled by leads 30 from cable 9, and it may be biased to stay open by the console or to work like a shutter in response to shutter trigger 12. The particular mode of operation desired will be preset by the operator on the console.

A mounting device 31 connects enclosure 20 to carriage 24 (shown in part). A support bar 33 provides a rigid connection from the optical control unit 35 to the mounting means 31 on the carriage. This allows the carriage to be moved by movements of handle 14. This also allows the bottom portion of enclosure 20 to be made of a light material, as it does not have to take the stress when the operator moves the laser. Unit 35 consists of a handle 14 and mirror support 36. Carriage mechanism 24 may be on any conventional design, such as that used for supporting an overhead X-ray machine. Preferably, the carriage will allow three-dimensional movement.

Mounted inside enclosure 20 are plane mirrors 37 and 38. These mirrors are mounted at 45° angles so as to reflect the laser radiation to a focusing mirror 40. If desired, the bottom portion of enclosure 20 need not be horizontal with the floor but may be angled down. If this is done, then a compensating half angle change in the angle of mirror 38 must be made. Mirror 40 is mounted on support 36 of unit 35 and can be rotated about a ball and socket joint 42 to various angles by handle 14. In this way small movements of the laser beam can be made without moving the laser unit. Mirror 40 will focus the laser radiation through opening 43 to a lens 44. Lens 44 is supported by rods 45, 46, and 47 and will provide for very fine further focusing of the laser radiation to a desired spot on a subject who will be on table 49. Table 49 should be an adjustable table. The spot size of the unfocused laser radiation can be controlled by the selection of different size diaphragms 28. This will allow the operator to control the spot size of the unfocused laser beam without changing the energy density of the beam.

If desired, laser 3 can be mounted in a vertical position for movement as a unit in three dimensions. In this arrangement the shutter diaphragm and lens would be mounted in series at one end of the laser and a handle means could be connected to the laser for movement of the laser by the operator to the desired position relative to the tissue to be cut.

Figure 2:
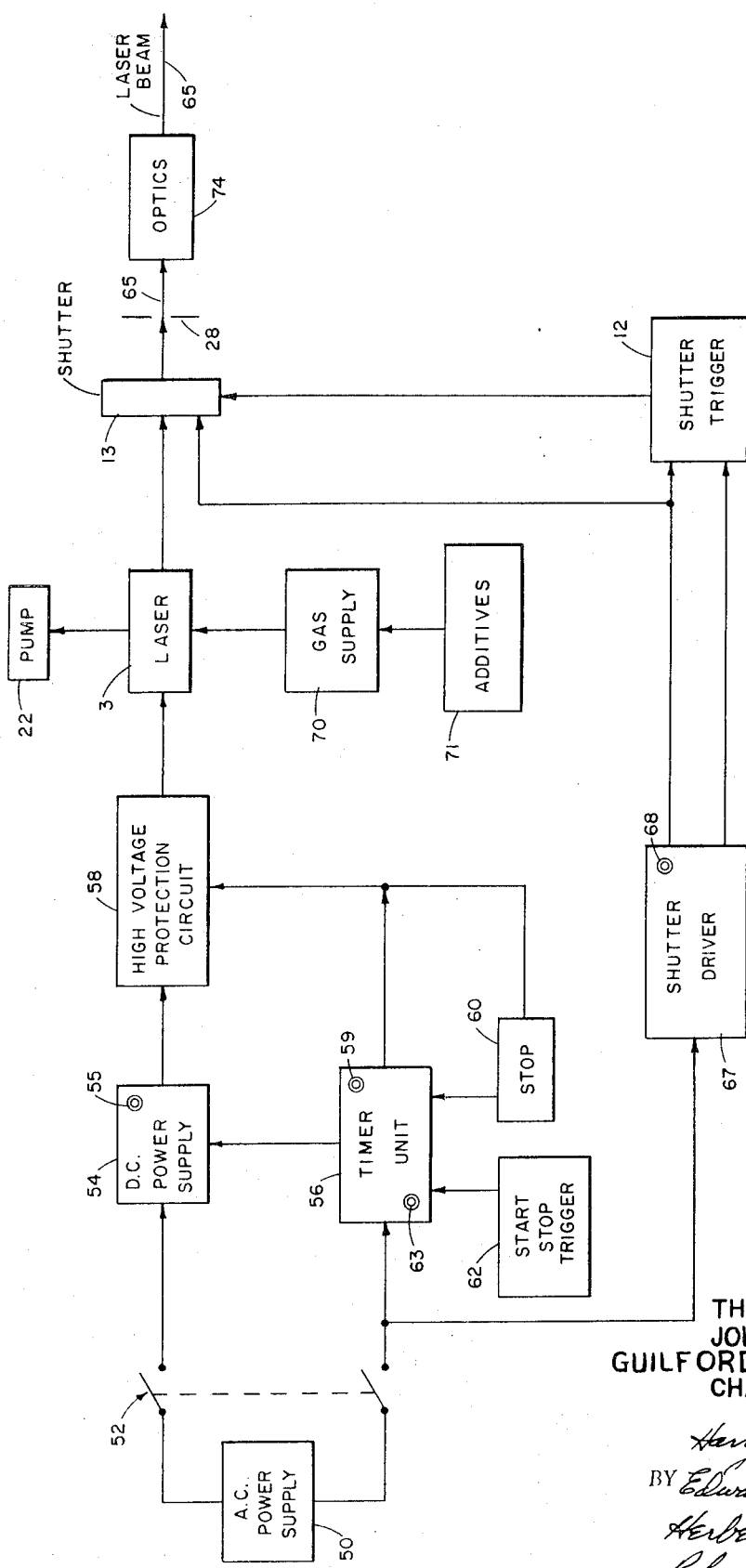
FIG. 2 shows a block diagram in accordance to the electrical control of the invention.

The electrical layout of the invention is shown in block form in FIG. 2. An AC power supply 50 provides the power for the system. A switch 52 is provided to connect and disconnect the AC power supply from the system. A DC power supply 54 converts the AC power into a high-voltage DC. The laser in the preferred form of the invention is operated with DC power, however, AC power may also be used. The laser might also be excited by thermal methods or by chemical reactions. All these operations can be controlled so as to vary the amount of power supplied to the laser. The DC power supply 54 has an output which can be adjusted within wide limits by a control knob 55. A timer unit 56 is connected to the DC power supply circuit and to a high-voltage protection circuit 58 so as to connect and disconnect the DC power supply to the laser. Its timing cycle may be varied from 0.01 seconds to continuously on, by setting control knob 59. High-voltage protection circuit 58 will, on command of timer 56, disconnect the DC power supply from the laser and connect the high-voltage side of laser 3 to ground. It will also reverse this, on command, so as to connect laser 3 to the power supply. A stop button 60 is provided to override timer unit 56 and to turn off the power to the laser. Also, it would be designed to disconnect power supply 50 and all other powers, if desired. A start, stop trigger 62 is provided to start time unit 56. Start, stop trigger 62 contains triggers 11 and 16 of FIG. 1, and is connected to timer 56 by way of a mode switch 63. This part of the device is similar to the control units on present day X-ray machines.

A shutter 13 is located in the path of the laser beam 65. The shutter is used to obtain exposures of the laser beam for periods of less than 0.01 seconds—the lower limit of time 56. A shutter driver 67 provides power for the shutter and can be set in two modes of operations; (1) The shutter open at all times; and (2) The shutter closed until operated by shutter trigger 12. The shutter speed (time) is adjustable by the operator. The laser beam passes through the shutter and diaphragm 28 to the optics 74 of the system where the beam is focused and utilized.

The laser is supplied with gas by gas supply 70. A vacuum pump 22 is provided to regulate the pressure inside laser 3. Gas supply 70 primarily supplies $CO_2$-$N_2$ gas to the laser; however, additives 71 may be presented to the laser to enhance the output power of the laser. Therefore, another control of the laser's output power is available to the operator.

To provide power to the system, switch 52 is closed and then the settings for the operation desired are made before a run is made. These settings are: (1) The amount of power output from supply 54—set by knob 55; (2) The amount of time the laser is to run—setting on timer unit 56; (3) The mode of operation of timer and trigger switches—set by switch 63; (4) The mode of operation of shutter driver 67—set by switch 68 and, if to be used, the shutter speed on shutter 13; and (5) the amount of additives to be supplied by gas supply 70. The desired-size diaphragm 28 should also be selected, and put in place before a run is made. It can easily be seen that the operator has a large choice in the type of run he is to make. Further, the operator can vary a particular output characteristic by more than one means.

By varying the amount of power output of DC power supply 54, the energy density of the laser beam is controlled. This can be used to advantage in that the operator can first set the power output at a low level and go through the operation (or procedure) to see that he is able to perform the operation correctly.

By setting the amount of time the laser is to run, an advantage is gained in the treatment of disorder such as malignant growths. In malignant growths treatment, the idea is to kill malignant growth and not too much of the normal tissue. By the use of proper time setting, even a relatively inexperienced practitioner could properly perform the operation. To use the laser in this manner the mode switch 63 is set in a timer-operative position. In this position the timer unit will not cause the power to be connected to the laser until one of the trigger switches of start, stop trigger 62 is depressed. Then timer 56 causes the DC power to be connected to the laser and, thereby, causes the laser to operate. The laser will stay in operation for the duration of the time selected on the timer—regardless of whether or not the trigger is released. After the selected time period is over, timer 56 causes the power to be disconnected from the laser; therefore turning it off. The timer unit automatically recycles and will again turn on the laser when a starter trigger is repressed. However, if the operator has not released the trigger from the first time, then the timer will not start the laser again, and the laser will not be started until the trigger is released and then repressed.

The timer unit can be effectively bypassed by setting mode switch 63 in its bypass setting and setting the timer unit to a high time setting. If desired, switch 63 could be wired to completely bypass the timing part of timer unit 56. With switch 63 in this position the laser is caused to turn on and off only in response to start, stop trigger 62. The operator can then perform the operation with power from the laser for any period he desires and the periods may be varied. This mode of operation is useful in making incisions or in cauterizing incisions.

If the time for the laser to be on is desired to be less than 0.01 seconds, then the shutter is used. A more expensive timer unit could be used to get shorter times, and the shutter could be eliminated. By the use of a shutter, a shorter recovery time of the laser is obtained as the laser is kept on. To make the shutter operable, shutter driver 67 is switched from a position in which it drives shutter 13 in a continuous open state to a position in which it is connected to the shutter by way of shutter trigger 12. The speed (time) of the shutter is adjustable. In this mode of operation the laser is turned on and kept on; however, there is no output from the surgical device as the shutter is now closed and will block the laser beam. An output for the time set on the shutter will be had by the operator by triggering the shutter trigger. Since the laser does not have to cut on and off and the timer unit does not have to recycle, the operator can get as many of these short output pulses as he desires and as fast as he can push and repush the shutter trigger.

Two further ways of controlling the power output of the laser can be had by controlling the amount of additives to be supplied by the gas supply and by selection of the size of diaphragm to be used. The use of diaphragms allows the operator to control the spot size of the unfocused laser beam of the system without changing the energy density of the beam. The diaphragm size can be chosen such that the total focused power is small, even though the setting on the DC power supply is high. In this way the operator can set all the controls on the console that he desires to have when he is to perform the operation, but he will still be able to make a trial run with low power output. When the operator is ready to make the real run then all he needs to change is the size diaphragm to be used, if any.

After the settings have been selected, the operation is simply a matter of positioning the focused laser beam on the area to be exposed. Small movement of the beam about the area of the operation may be made by movement of handle 14 about joint 42. Larger movements are obtained by movement of the laser with the carriage 24.

We claim:

1. A laser surgical device comprising a continuous wave laser of the type that can be operated continuously for at least several minutes, said laser having an output beam, said output beam being of a wavelength such that it is substantially totally absorbed at the surface of tissue; mounting means connected to said laser so as to allow it to be positioned in desired locations; receiving means disposed relative to said laser to receive the output beam of said laser, focus it, and direct the focused beam to a desired area of said tissue; and control means connected to the laser so as to control various output characteristics of said laser and allow a physician to manipulate the laser beam and make a surface incision with the laser surgical device by directing the laser beam along the surface of tissue.

2. A laser surgical device as set forth in claim 1, wherein said laser is a $CO_2$-$N_2$ gas laser.

3. A laser surgical device as set forth in claim 1, wherein said control means has a controllable power supply means connected to said laser to provide power thereto, and a timer unit connected to said power supply means so as to connect and disconnect the power supply means to the laser.

4. A laser surgical device as set forth in claim 3, wherein said control means further comprises trigger means connected to said timer unit and remotely positioned relative to said timer unit to allow the timer unit to be started from the remote position.

5. A laser surgical device as set forth in claim 4, wherein said laser is a $CO_2$-$N_2$ gas laser.

6. A laser surgical device as set forth 5, further comprising a controllable shutter means positioned between said receiving means and said laser means and shutter trigger means connected to the shutter means for controlling the shutter means.

7. A laser surgical device as set forth in claim 1, wherein said mounting means is a movable carriage means for positioning the laser, receiving means, and, therefore, the output beam when a large movement of the focused beam is desired; and said receiving means has a focusing means with a handle attached thereto, a universal connection between said carriage and said handle and said focusing means, said focusing means being movable by said handle relative to the output beam so as to provide for smaller movements of the focused beam, whereby both large and small movements of said focused beam may be made by movements of said handle.

8. A laser surgical device as set forth in claim 7, wherein said receiving means further contains a diaphragm means positioned between the laser and the focusing means so as to control the spot size of the beam from the laser to the focusing means.

9. A laser surgical device as set forth in claim 8, wherein said receiving means is a container positioned around at least an output end of said laser, said focusing means and said diaphragm means being located inside said container, said container having angles in its shape so as to locate the focusing means at a desired position relative to the laser, and reflecting means located inside the container so as to reflect the output beam of the laser towards said focusing means.

10. A laser surgical device as set forth in claim 9, wherein said laser is a $CO_2$-$N_2$ gas laser.

11. A laser surgical device as set forth in claim 10, wherein said control means contains a controllable power supply means; a protection device, said power supply means being connected to the laser through said protection device, said protection device being adapted to connect and disconnect the power supply means to the laser; and a controllable timer unit having trigger means connected to said timer unit so as to start said timer unit, and said timer unit being connected to said power supply means and said protection device to connect and disconnect said power supply means to the laser.

12. A laser surgical device comprising a high-power continuous wave $CO_2$-$N_2$ gas laser having an output beam; receiving means adapted to receive the output beam of said laser; mounting means connected to said laser and said receiving means; control means connected to the laser so as to control various output characteristics of said laser; and focusing means in said receiving means for focusing the output beam comprising a reflecting means with a handle universally jointed to said receiving means for universally adjusting said reflecting means and thereby direct the output beam to desired location; means disposed in said reflecting means for focusing the output beam; and a diaphragm disposed inside said receiving means between the laser and the focusing means so as to control the spot size of the beam from the laser to the focusing means.

* * * * *